UNITED STATES PATENT OFFICE.

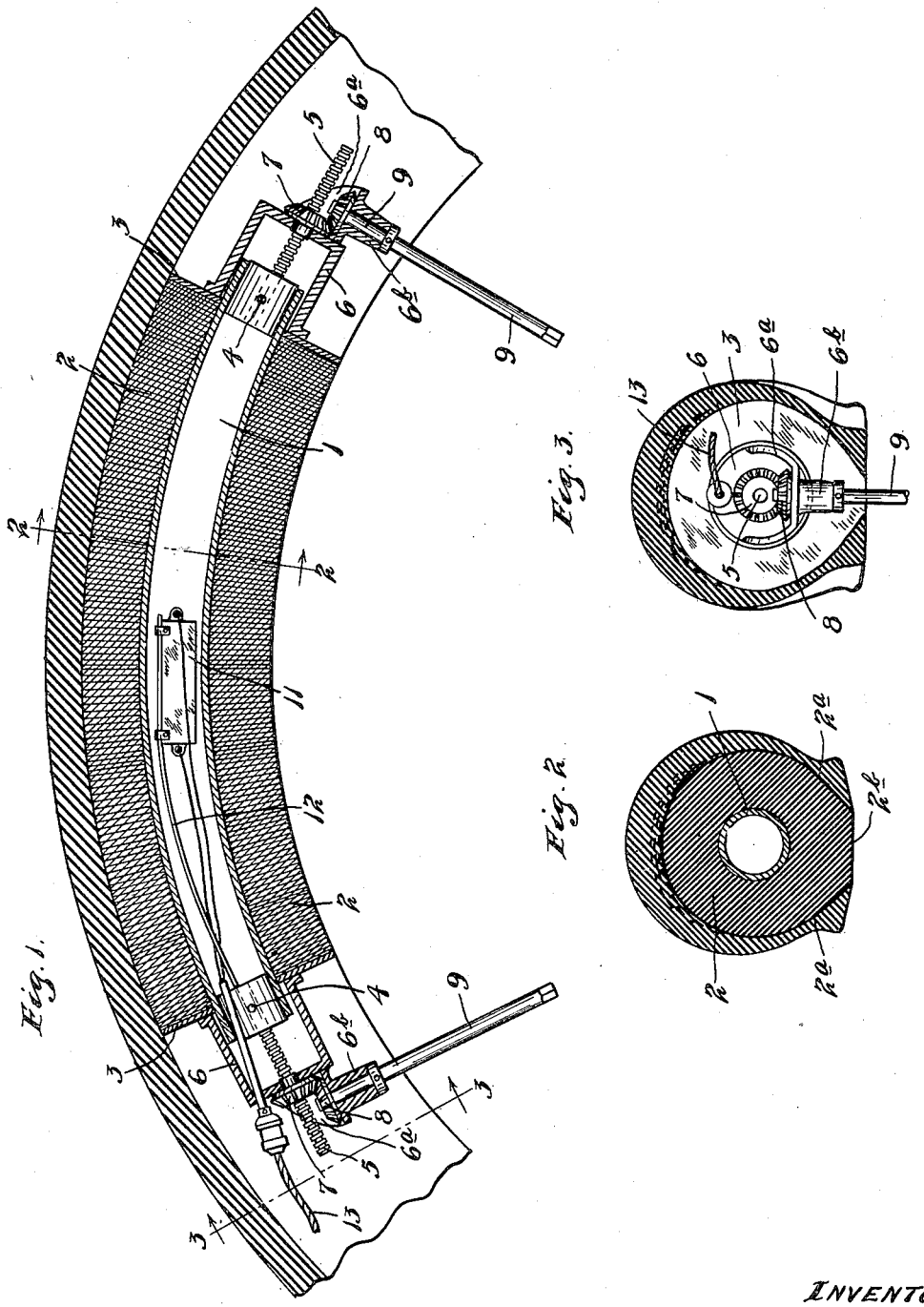

CLARENCE J. DROPE, OF MINNEAPOLIS, MINNESOTA, ASSIGNOR TO DERBY TIRE CO., OF MINNEAPOLIS, MINNESOTA, A CORPORATION OF MINNESOTA.

VULCANIZING DEVICE.

1,404,942.  Specification of Letters Patent.  Patented Jan. 31, 1922.

Application filed June 18, 1921. Serial No. 478,505.

*To all whom it may concern:*

Be it known that I, CLARENCE J. DROPE, a citizen of the United States, residing at Minneapolis, in the county of Hennepin and State of Minnesota, have invented certain new and useful Improvements in Vulcanizing Devices; and I do hereby declare the following to be a full, clear, and exact description of the invention, such as will enable others skilled in the art to which it appertains to make and use the same.

This invention relates to a vulcanizing device, and particularly to such a device of the type which comprises a vulcanizing core adapted to be placed inside of a tire or other article to be vulcanized and to hold the same in proper position for vulcanization as well as to transmit heat thereto.

It is an object of this invention to provide such a vulcanizing device comprising a core, which core is compressible and composed of a plurality of sections together with means for compressing said sections from each end of the device so that an even and uniform expansion is obtained.

It is a further object of the invention to construct such a core of curved shape and comprising a curved internal sleeve on which the compressing means are movably mounted.

These and other objects and advantages of the invention will be apparent from the following description made in connection with the accompanying drawings in which like reference characters refer to the same parts throughout the different views, and in which—

Fig. 1 is a longitudinal vertical section through the device showing the same in position in a tire casing.

Fig. 2 is a radial section of the same taken on the line 2—2 of Fig. 1, looking in the direction of the arrows; and Fig. 3 is also a section of Fig. 1 taken on the line 3—3 of Fig. 1, looking in the direction of the arrows.

Referring to the drawings, the device comprises a central sleeve member 1 preferably forming a metal pipe. On the member 1 are arranged a plurality of comparatively thin washer or laminated members 2, which members are somewhat thicker at their outer portions, and the sides of which lie substantially in radial planes, radiating from the center of the sleeve 1. As clearly shown, the members 2, together, form a curved core about the member 1, and these members are substantially semi-cylindrical at their outer portions, and at their inner portions are formed with approximately straight sides $2^a$ and with an inner straight portion $2^b$, thus quite accurately simulating the natural shape of the tire. The shape of the member 2 is quite an important feature of applicant's invention and such shape is necessary to hold the ordinary tire in the proper position for vulcanization. A rigid washer member 3, preferably of metal contacts with each end member 2 and is arranged to move freely on the sleeve member 1. Plugs 4 which are received somewhat loosely inside of the sleeve 1 are connected thereto with capacity for swinging movement by set screws passing into the same from opposite sides of the sleeve 1, and screws 5 project from the plugs 4, being rigidly secured therein at one end. Cap members 6 formed as open ended cylinders surround the ends of the sleeve 1 and have slight flanges formed thereon abutting the washers 3. A beveled gear 7 has its hub portion journaled centrally in the closed end of the cap member 6, and said hub portion is formed as a nut engaging with the screw 5 and this gear meshes with a similar beveled gear 8 mounted on the end of a shaft 9 which is journaled in a projecting hub $6^b$ formed on a projecting flange $6^a$ which is integral with the closed end of cap member 6. The shaft 9 projects substantially radial from the sleeve 1 and has a small collar pinned thereto holding the same in position in the hub $6^b$. The outer end of the shaft 9 is squared to receive a suitable wrench by which the same is turned. It will be understood that the screw and gear structure described is the same on each of the cap members 6. In order to furnish heat to the inside of the core, an electrical resistance heat member 11 is disposed in the core and supported on the rod 12 secured in one of the plugs 4 and electrical conductors 13 are connected to the heating element which conductors will, in turn, be connected to the usual connecting plug for an electric socket.

In the figures of the drawings the core is shown as disposed in a tire casing. In the use of the device, the same will be placed in the tire or member to be vulcanized at the desired point and the tire can then be placed in the vulcanizing frame which will be applied to the outside thereof. The shaft 9 will then be turned and the cap members 6 will be drawn toward the center of sleeve 1 and through the washers or plates 3 will press onto the compressible members 2. Both shafts 9 being turned the compressible members or washers 2 will be evenly and uniformly compressed toward the center and the core will thus be expanded in cross section and will fill the tire and hold the same firmly in fully distended position so that the vulcanizing operation on the same can be efficiently and perfectly performed. By the shape of the members 2, all parts of the casing are distended and the tire is thus distended and held in firm position at all points.

The screws 5 and blocks 4 can swing somewhat about the screws holding the same to the sleeve 1 and will thus automatically assume positions so that the sleeve 6 will always press on the washers 3 and 2 in a line substantially normal to the radius of the sleeve. This results in an even pressure being applied to the compressible members. It has heretofore been proposed to compress the members 2 only from one end. With such a structure it was found that the core was not expanded evenly throughout its length and that the washers nearest the compression device would be expanded more than those remote therefrom. With the present structure of compressing the core equally from both ends, an even and uniform expansion of the same is obtained.

The heat is supplied to the interior of the core during the vulcanization by the electrical heating member 11 and this heat will be radiated through the members 1 and 2 to the casing. While this heat will not be very intense, enough heat can thus be radiated to assist effectively in the vulcanization. It will, of course, be understood that if desired, a thermostat for controlling the supply of heat can be used with the device.

From the above description it is seen that applicant has provided an improved structure of vulcanizing core and one whose operation is rapid and efficient. In practice, different sized cores will, of course, be used for different sized casings and the parts of the device will be varied accordingly. If desired, steam or other heating means may be used instead of the electrical heating means shown.

It will also be understood that various changes may be made in the form, details and arrangement of the device without departing from the scope of applicant's invention, which, generally stated, consists in the matter shown and described and set forth in the appended claims.

What is claimed is:

1. A vulcanizing device having in combination a hollow cylindrical sleeve, a plurality of comparatively thin washers of compressible material movably mounted thereon, a movable member mounted on said sleeve at each end thereof adapted to abut the end washers, and means for moving said members toward the center of the sleeve to compress said washers.

2. The structure set forth in claim 1, said sleeve being curved longitudinally substantially on the arc of a circle and said washers having their surfaces lying in planes radial to the center of said sleeve.

3. A vulcanizing device comprising a hollow curved cylindrical sleeve, a plurality of laminated compressible members movably mounted on said sleeve, members swingingly mounted on said sleeve at each end thereof, cap members mounted over the ends of said sleeve and arranged to abut against the end laminated members, and means mounted on said swingingly mounted members for moving said cap members toward the center of said sleeve to compress the laminated member.

4. A vulcanizing device comprising a hollow cylindrical curved sleeve, a plurality of laminated members movably mounted thereon and forming a substantially solid core member, plugs pivotally mounted in the ends of said sleeve having screws extending therefrom, cap members surrounding the ends of said sleeve and arranged to abut against the end laminated members, means carried by said cap member for engaging with said screws, and means also carried by said cap member for operating the last mentioned means to move the cap members toward the center of the sleeve to compress the laminated members.

5. A vulcanizing device comprising a hollow cylindrical sleeve and a plurality of comparatively thin washer members movably mounted thereon to form a substantially solid core, said members being shaped at their outer portions substantially circular but having straight inner portions and substantially straight portions extending from the ends of said straight inner portions, and joining said circular portion, whereby the members substantially fit in a tire casing, and means for compressing said members to expand the core.

6. A vulcanizing device comprising a hollow cylindrical curved sleeve, a plurality of laminated members movable mounted thereon and forming substantially a solid core, the surface of said members lying in planes substantially radial to the center of said sleeve, the said members being shaped in elevation with the outer portions substantially circular, with their inner side and bottom portions substantially straight, and means for moving said members toward the center of said sleeve to compress the same.

7. A device of the class described comprising a sleeve member, a plurality of comparatively thin compressible washers mounted thereon, and means at each end of the sleeve abutting the end washers, and movable toward each other to compress said washers.

In testimony whereof I affix my signature.

CLARENCE J. DROPE.